Dec. 12, 1933.  H. H. PURVIS  1,939,611
STORAGE AND DISPENSING APPARATUS FOR CARBON DIOXIDE
Filed May 11, 1932
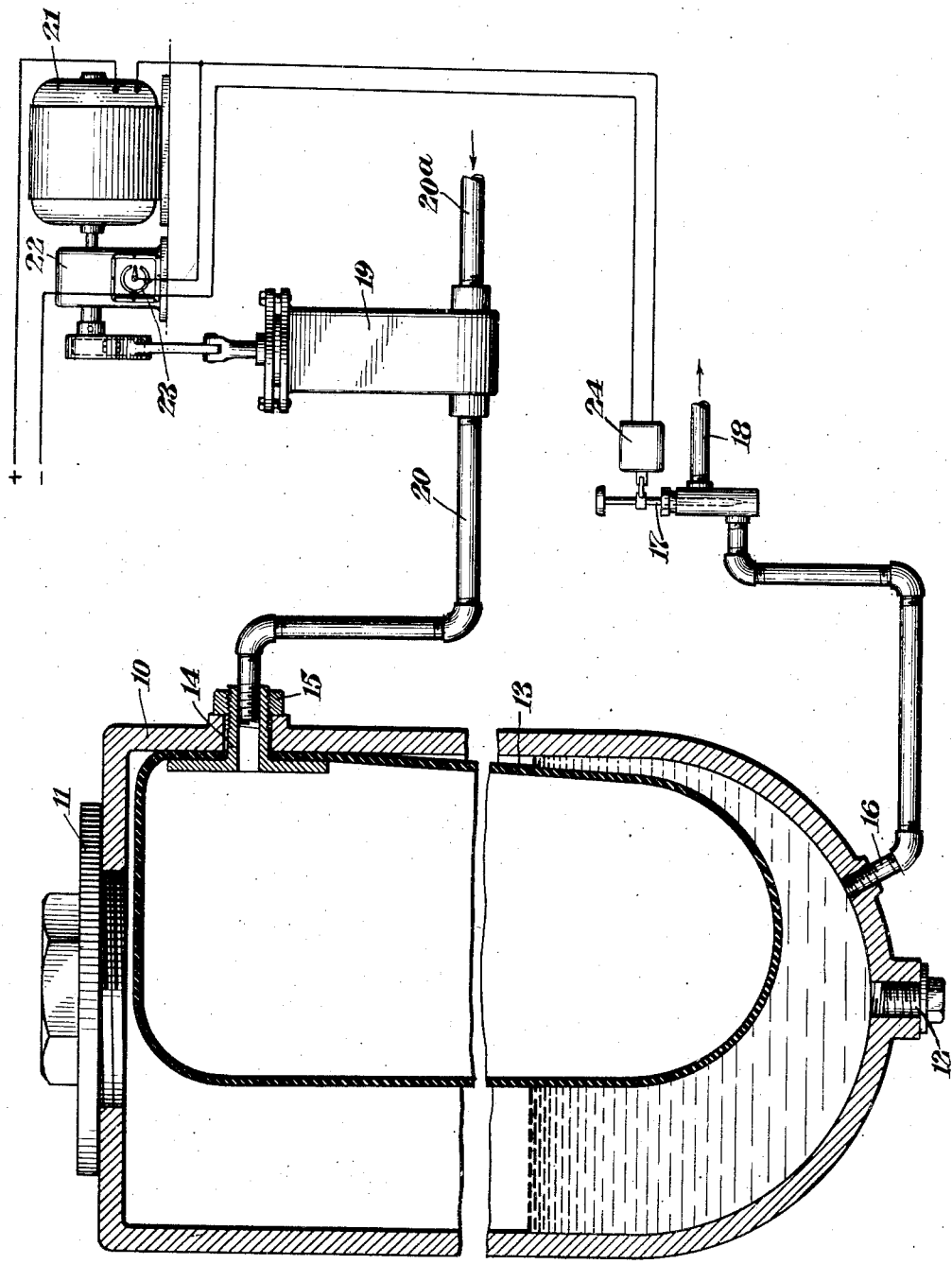
INVENTOR
*Harry H. Purvis*
BY
*Kenyon & Kenyon*
ATTORNEYS Patented Dec. 12, 1933

1,939,611

UNITED STATES PATENT OFFICE 1,939,611

STORAGE AND DISPENSING APPARATUS FOR CARBON DIOXIDE

Harry H. Purvis, Port Jefferson, N. Y.

Application May 11, 1932. Serial No. 610,589

4 Claims. (Cl. 62—1)

This invention relates to apparatus for storing and dispensing liquid carbon dioxide.

A given weight of carbon dioxide contained within a storage chamber of definite volume and subject to a high pressure will exist partially in liquid form and partially in gaseous form, a definite relationship existing between the liquid and the gas. A decrease in the contents of the storage chamber, such as would accompany the withdrawal of a unit portion of liquid carbon dioxide results in vaporization of some of the liquid carbon dioxide remaining in the chamber, thus decreasing the amount of liquid carbon dioxide in the chamber by an amount greater than the amount of liquid withdrawn and effecting a corresponding increase in gas. Continued withdrawals of unit portions of liquid carbon dioxide results in a cumulative decrease in the volume of residual liquid carbon dioxide greater than the amount of liquid carbon dioxide actually withdrawn and the amount of liquid carbon dioxide eventually obtained is substantially less than the amount of liquid carbon dioxide inherently available.

An object of this invention is an apparatus for storing and dispensing carbon dioxide equipped with means operable upon withdrawal of liquid carbon dioxide from the storage chamber to reduce the effective volume of the storage chamber equal to the volume of the withdrawn liquid carbon dioxide, thereby maintaining constant the volume of carbon dioxide gas and preventing vaporization of the residual liquid carbon dioxide so that the full amount of inherently available liquid carbon dioxide is obtained.

An apparatus embodying the invention comprises a storage chamber containing a fluid-tight inflatable bag or collapsible container. Means are provided to pump fluid under pressure into said bag or container simultaneously with each withdrawal of liquid carbon dioxide from the chamber. Sufficient fluid is pumped into the container to increase the volume of the container equal to the volume of the withdrawn liquid carbon dioxide, thereby effecting a corresponding reduction in the effective volume of the storage chamber and maintaining constant the volume of carbon dioxide gas. In this way, vaporization of the residual liquid carbon dioxide is prevented and the reduction in liquid content of the chamber is the same as the amount of liquid withdrawn. The entire inherently available liquid carbon dioxide is thus obtained.

Other objects, novel features and advantages of this invention will be apparent from the following specification and accompanying drawing, wherein the single figure illustrates an apparatus embodying the invention, the container being partially inflated and the charge of carbon dioxide being partially dispensed.

The apparatus herein disclosed is of particular utility in connection with the manufacture of dry ice pellets. At each operation of the apparatus, the required amount of liquid carbon dioxide to fill the mold for the ice pellets is withdrawn from the chamber and at the same time the same volume of liquid is introduced into the container to keep constant the volume of carbon dioxide gas in the chamber.

The storage chamber 10 for the carbon dioxide is provided with a filling opening closed by a plug 11 and a drainage opening closed by a plug 12. Within the chamber 10 there is provided a bag or container 13 of suitable flexible and fluid-impervious material. This bag is clamped to the wall of the container by a fitting 14 and a nut 15, the fitting being tubular to provide communication with the interior of the container. Near the bottom of the container there is provided a draw-off 16 controlled by a needle valve 17. A conduit 18 leads from the needle valve and by this conduit liquid carbon dioxide may be directed into a dry ice pellet mold (not shown).

A pump 19 has its outlet port communicating through a pipe 20 with the interior of the container 13. The inlet port of the pump is connected by a pipe 20a with a source of liquid, not shown. This pump is driven by a motor 21 through the medium of a reduction gearing 22. Switch mechanisms 23 and 24 operated by the needle valve and the pump operating means are provided for starting the motor upon operation of the needle valve to fill a mold with carbon dioxide and stopping the motor after a predetermined number of strokes of the pump.

The number of strokes of the pump is such that the liquid forced into the container 13 is of the same volume as the volume of the liquid carbon dioxide withdrawn to fill the mold. The switching mechanism for controlling operation of the motor is not shown in detail as such mechanism is obtainable on the open market and its particular construction is not part of this invention. Any control apparatus which will effect pumping of a predetermined amount of liquid into the container is satisfactory.

With the container 13 deflated a predetermined charge of carbon dioxide is introduced into the chamber through the filling opening, the weight of the charge being determined by the size of the chamber and the pressure to be maintained in the chamber. The carbon dioxide may be introduced in the form of dry ice or in the form of liquid carbon dioxide under pressure. If the carbon dioxide is introduced in the form of dry ice vaporization thereof builds up the pressure within the chamber to the pressure at which carbon dioxide exists partially in liquid form and partially in the form of gas. The apparatus is now ready for use.

In order to produce an ice pellet, the valve 17 is opened and the operator directs liquid carbon dioxide through the conduit 18 into the mold until the latter is filled, whereupon the operator closes the needle valve. The operation of the needle valve 17 starts the motor 21, thereby actuating the pump 19 to force liquid into the container 13. The motor continues to run to operate the pump for the predetermined number of strokes and then stops, the valve 17 having been closed. The pump thus introduces into the container 13 the same volume of liquid as the volume of liquid carbon dioxide drawn off to form an ice pellet and the volume of carbon dioxide gas in the chamber is maintained constant.

Vaporization of the residual liquid carbon dioxide is prevented and there is no decrease in the liquid carbon dioxide beyond the amount drawn off to form a dry ice pellet. The combined volume of the liquid carbon dioxide and the liquid in the container is maintained constant so that there can be no decrease in the volume of the carbon dioxide gas.

Where the liquid carbon dioxide is drawn off in portions of different volume, the pump control means may be replaced with pressure responsive control means for the pump so that liquid is introduced into the container in sufficient quantity to maintain uniform pressure within the chamber and thus prevent increase in the volume of carbon dioxide gas. The effect will be the same and decrease of residual liquid carbon dioxide by vaporization will be avoided.

The container 13 may be composed of any suitable material which will collapse to permit introduction of carbon dioxide into the chamber and will expand upon the introduction of liquid into it. If desired, the bag may be made of some elastic material, but this is not necessary as flexible material will serve the purpose equally well. It is necessary only that the bag be capable of inflation so as to substantially fill the chamber.

It is of course understood that various modifications may be made in the apparatus above described without in any way departing from the spirit of the invention as defined in the appended claims.

I claim:

1. A storage and dispensing apparatus for carbon dioxide comprising a chamber, an inflatable container therein, a liquid draw-off, a pump for forcing fluid into said container, a valve for said draw-off, and means controlled by said valve for operating said pump.

2. A storage and dispensing apparatus for carbon dioxide comprising a chamber, an inflatable container therein, a liquid draw-off, a valve, a pump for forcing fluid into said container, pump actuating means, means actuated by said valve for starting said pump operating means, and automatic means for shutting off the pump operating means after a predetermined extent of operation.

3. A storage and dispensing apparatus for carbon dioxide comprising a chamber, an inflatable container therein, a liquid draw-off, a pump for forcing fluid into said container, pump operating means, a valve for said draw-off, means responsive to opening said valve to start said pump operating means, and automatic means for shutting off the pump operating means after a predetermined extent of operation.

4. A storage and dispensing apparatus for carbon dioxide comprising a chamber, a collapsible container therein, a liquid draw-off, a pump for introducing liquid into said container, pump actuating means, means actuated by said valve for starting said pump operating means, and automatic means for shutting off said pump after a predetermined volume of liquid has been introduced into the container, thereby maintaining substantially constant the volume of carbon dioxide gas within said chamber.

HARRY H. PURVIS.